United States Patent [19]
Yoshida

[11] Patent Number: 5,014,272
[45] Date of Patent: May 7, 1991

[54] FRAME SYNCHRONIZER FOR DETECTING MISFRAMES WITH DIFFERENT SHIFT PATTERNS

[75] Inventor: Norio Yoshida, Tokyo, Japan

[73] Assignee: NEC Corporation, Japan

[21] Appl. No.: 392,349

[22] Filed: Aug. 11, 1989

[30] Foreign Application Priority Data

| Aug. 11, 1988 [JP] | Japan | 63-201598 |
| Dec. 12, 1988 [JP] | Japan | 63-313115 |
| Dec. 12, 1988 [JP] | Japan | 63-313116 |
| Dec. 12, 1988 [JP] | Japan | 63-313117 |

[51] Int. Cl.$^5$ ............................................ H04J 3/06
[52] U.S. Cl. .................................. 370/106; 370/100.1; 370/105.1; 375/114; 375/116
[58] Field of Search ............... 370/106, 105, 105.1, 370/100.1, 108, 112; 375/114, 116; 371/47

[56] References Cited

U.S. PATENT DOCUMENTS

| 3,662,114 | 5/1972 | Clark | 370/106 |
| 3,909,541 | 9/1975 | Bobilin | 370/105.1 |
| 4,602,367 | 7/1986 | McDermott, III | 375/114 |
| 4,748,623 | 5/1988 | Fujimoto | 375/116 |
| 4,835,768 | 5/1989 | Hubbard et al. | 370/106 |
| 4,847,877 | 7/1989 | Besseyre | 375/116 |

Primary Examiner—Douglas W. Olms
Assistant Examiner—Alpus H. Hsu
Attorney, Agent, or Firm—Ostrolenk, Faber, Gerb & Soffen

[57] ABSTRACT

A frame synchronizer is adapted to receive an incoming high-speed TDM (time division multiplex) signal of a framed structure containing, at frame intervals, a sequence of identical synchronization bit patterns and a sequence of byte-length data signals. A demultiplexer decomposes the high speed TDM signal into the synchronization bit patterns and the byte-length data signals and supplies them as low-speed frames to output ports. A plurality of bit pattern detectors are provided for respectively detecting different bit patterns which are successively obtained from the decomposed synchronization bit patterns when timing of the demultiplexer is successively delayed or advanced with respect to the incoming TDM signal. Each of the different bit patterns is an n-bit shifted version of the decomposed synchronization bit patterns, where n is an integer representing the amount of the delay or advance. In accordance with the detected different bit patterns, the timing of the demultiplexer is controlled.

16 Claims, 15 Drawing Sheets

FRAME SYNCHRONIZER FOR DETECTING MISFRAMES WITH DIFFERENT SHIFT PATTERNS

BACKGROUND OF THE INVENTION

The present invention relates generally to frame synchronizers for establishing synchronization between a high speed TDM (time division multiplex) signal and demultiplexed low speed signals.

In frame synchronizers, low speed digital signals are multiplexed into a high speed TDM signal to achieve a high level of utilization of channel resources and transmitted to a distant end where it is decomposed by a demultiplexed into the individual components. The low speed signals are usually multiplexed in units of a byte length into a frame and a sync pattern is inserted at the beginning of each frame. In a prior art system, a frame synchronizer is provided at the input port of the demultiplexer to detect the sync pattern to control the demultiplex timing so that the low speed signals appear at proper output ports of the demultiplexer. This frame synchronizer first establishes synchronism with the incoming high speed TDM signal using the inserted sync pattern, and then proceeds to decompose the synchronized signal into the low speed components. However, the recent tendency toward using TDM signals at a speed in the range between several hundred Mbps and several Gbps makes it difficult to implement a frame synchronizer capable of operating in this speed range.

SUMMARY OF THE INVENTION

It is therefore an object of the present invention to provide a frame synchronizer which is capable of establishing synchronism with a high speed TDM signal in a range of Gbps for properly demultiplexing it into low speed signals.

According to the present invention, the frame synchronizer is adapted to receive an incoming high-speed TDM (time division multiplex) signal of a framed structure containing, at frame intervals, a sequence of identical synchronization bit patterns and a sequence of byte-length data signals. The synchronizer includes a demultiplexer for decomposing the high speed TDM signal into the synchronization bit patterns and the byte-length data signals and supplying the decomposed bit patterns and data signals respectively as low-speed frames to output ports. A plurality of bit pattern detectors are provided for respectively detecting different bit patterns which are successively obtained from the decomposed synchronization bit patterns when timing of the demultiplexer is successively delayed or advanced with respect to the incoming TDM signal. Each of the different bit patterns is an n-bit shifted version of the decomposed synchronization bit patterns, where n is an integer representing the amount of the delay or advance. In accordance with the detected different bit patterns, the timing of the demultiplexer is controlled.

Preferably, the synchronization bit patterns are composed of a sequence of 8-bit patterns so that eight different bit patterns are generated successively when the timing of the demultiplexer is successively delayed or advanced with respect to the incoming TDM signal. The bit pattern detectors respectively detect such eight different bit patterns and the demultiplexer is provided with a plurality of 8-bit sets of outputs ports for respectively supplying the low speed signals to the 8-bit sets of the output ports.

To establish proper channel sync timing even if bit synchronism is established, the incoming TDM signal contains, at frame intervals, a sequence of 8-bit channel identifiers. A channel identifier detector is provided for detecting one of the channel identifiers to control the demultiplexer timing. In one embodiment, the channel identifier detector detects successive 16-bits of the channel identifiers in response to the detection of any one of the different synchronization bit patterns when the demultiplexer is out of sync with the incoming TDM signal and selects 8 bits of the detected channel identifiers in accordance with the detected synchronization bit pattern to control the demultiplexer timing. This is advantageous for simultaneously establishing bit and channel sync timing. Alternatively, the channel identifier detector detects one of the channel identifiers in response to the detection of a predetermined different synchronization bit pattern when the demultiplexer is in sync with the incoming TDM signal to control the demultiplexer timing with the detected channel identifier. This is useful for establishing bit and channel sync timing in sequence.

In a further preferred form of the invention, one of the bit pattern detectors exclusively detects a predetermined synchronization bit pattern which indicates that the timing of the demultiplexer means is in sync with the incoming TDM signal, and each of the other bit pattern detectors comprises a first pattern detector for detecting the predetermined synchronization bit pattern when the demultiplexer is out of sync with the TDM signal, and a second pattern detector for exclusively detecting one of the other synchronization bit patterns in response to the detection of the predetermined bit pattern by the first pattern detector. The demultiplexer timing is controlled in accordance with the first and second pattern detectors.

Each of the bit pattern detectors comprises a pattern detector for detecting a preselected one of the synchronization bit patterns which appears at the output ports of the demultiplexer when it is bit synchronized with the TDM input. A forward guard counter is incremented at frame intervals in the absence of an output signal from the pattern detector and generates a first counter output when its count reaches a predetermined forward count value. A backward guard counter is incremented at frame intervals in the presence of the output signal of the pattern detector and generates a second counter output when its count reaches a predetermined backward count value. A bistable device is to the first counter output for generating a signal indicating that the demultiplexer is in sync with the incoming TDM signal and responsive to the second counter output for generating signal indicating that the demultiplexer is out of sync with the incoming TDM signal.

Preferably, the forward count value of a first one of the bit pattern detectors is greater than the forward count value of a second one of the bit pattern detectors, the first and second bit pattern detectors detecting the same synchronization bit pattern which appears at the output ports of the demultiplexer when the demultiplexer is in sync with the incoming TDM signal. Each of the bit pattern detectors comprises a pattern detector for detecting the synchronization bit pattern which appears at the output ports of the demultiplexer when it is in sync with the incoming TDM signal. A frame counter is incremented at frame intervals to generate a frame counter pulse output when its count reaches a predetermined value corresponding to the length of the low-speed frames and a binary output representing an instantaneous value of its count. A forward guard counter is incremented in response to the frame counter pulse output in the absence of the output signal of the pattern detector to produce a forward counter output when the count reaches a predetermined forward count value. A backward guard counter is incremented in response to the frame counter pulse output in the presence of the output signal of the pattern detector to generate a backward counter output when its count reaches a predetermined backward count value. A bistable device is responsive to the forward counter output for generating a signal indicating that the demultiplexer is in sync with the incoming TDM signal and responsive to the backward counter output for generating a signal indicating that the demultiplexer is out of sync with the incoming TDM signal. The frame counter of a first one of the bit pattern detectors is arranged to vary its instantaneous value and a selector is provided for selecting the frame counter binary output generated by a second one of the bit pattern detectors which has detected one of the different bit patterns. The selected binary output is applied to the frame counter of the first bit pattern detector to advance its instantaneous value for quick restoration of synchronization.

BRIEF DESCRIPTION OF THE DRAWINGS

The present invention will be described in further detail with reference to the accompanying drawings, in which.

DETAILED DESCRIPTION

Figure 1:
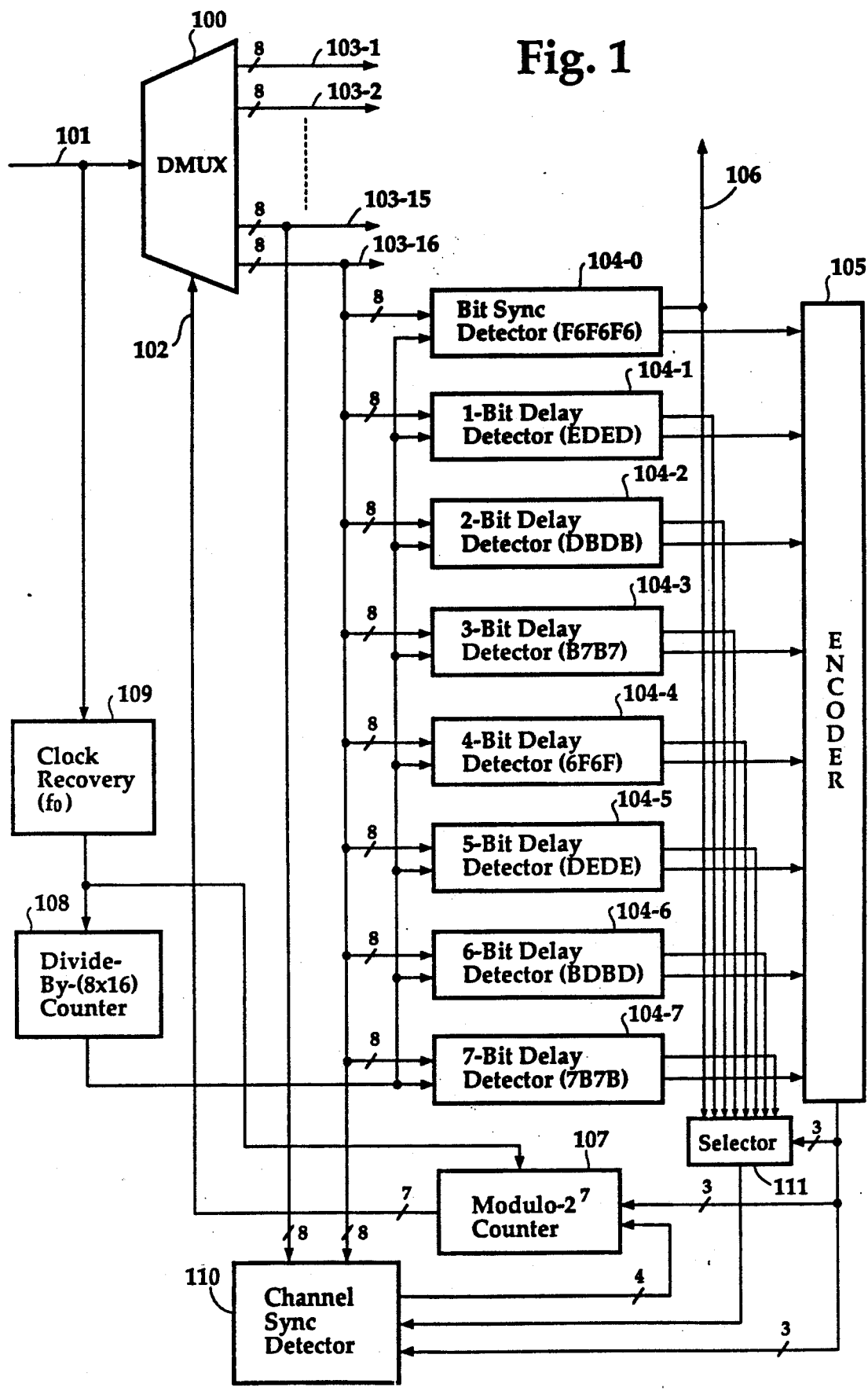
FIG. 1 is a block diagram of a frame synchronizer according to a first embodiment of the present invention in which bit and channel synchronizations are simultaneously reestablished.

Referring now to FIG. 1, there is shown a frame synchronizer for a demultiplexer which decomposes a high speed TDM (time division multiplex) signal into low speed signals according to one embodiment of the present invention. A TDM demultiplexer 100 receives through an input port 101 an incoming serial data signal framed at a high TDM hierarchical level and demultiplexes the high speed frame into sixteen outgoing 8-bit parallel data signals framed at a lower TDM hierarchical level in accordance with a 7-bit switching control signal applied to a 7-bit port 102 for delivery to 8-bit-wide output ports 103-1 through 103-16, respectively. A frame synchronizer is provided which includes a bit sync detector 104-0 and a plurality of delay detectors 104-1 through 104-7. All input terminals of the frame sync and delay detectors are connected together to receive the 8-bit outputs of the ports 103-16, for example.

Figure 2:
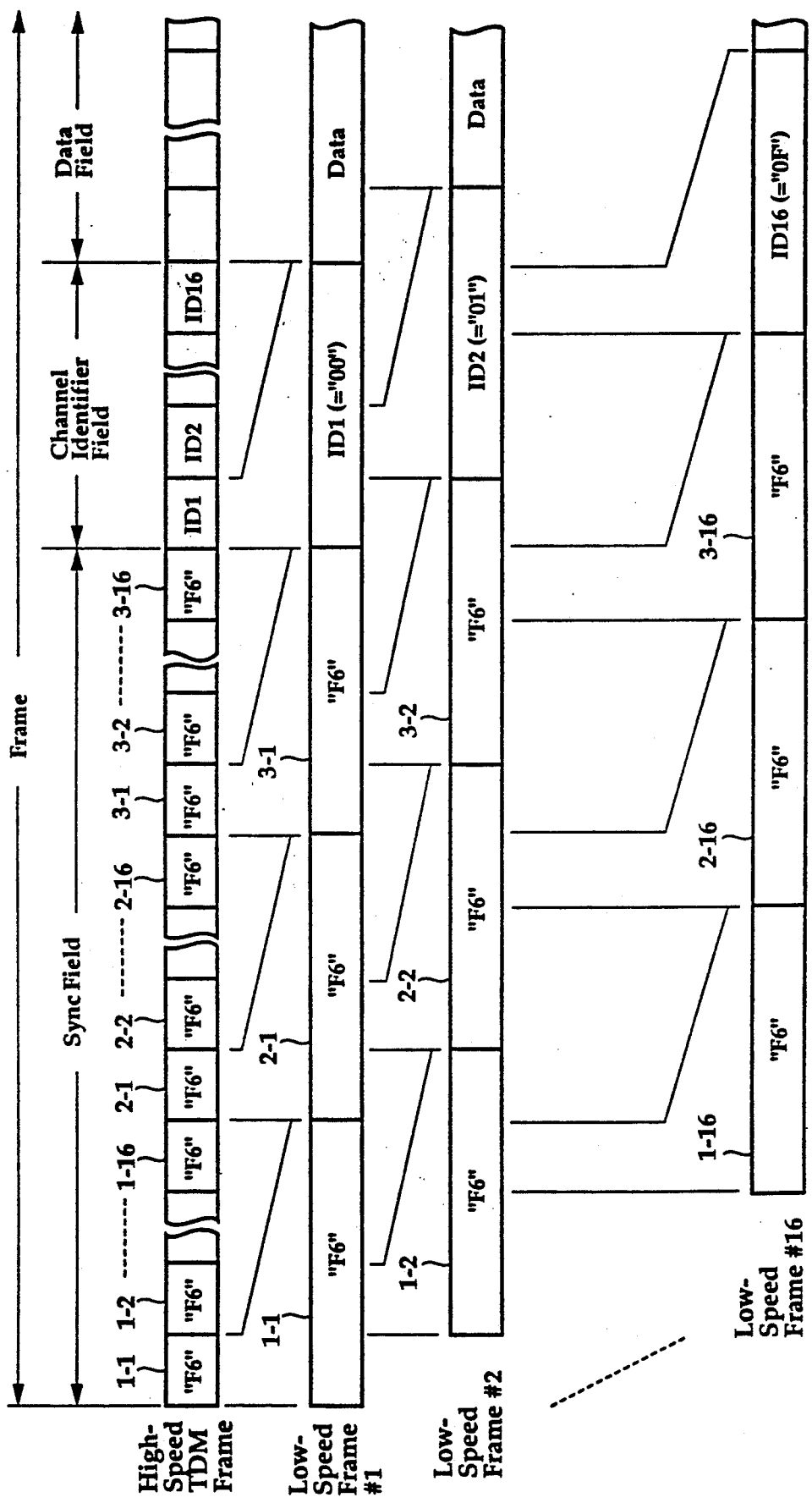
FIG. 2 is an illustration of the data structures of the high-speed TDM input and the low-speed demultiplexer outputs of FIG. 1.

As illustrated in FIG. 2, the incoming TDM frame is composed of a (3×16)-byte-length frame sync field containing three sequences of 16 identical frame sync patterns of one-byte length each. Each of the sync patterns is "11110110", or hexadecimal F6, for example. The sync patterns contained in the first sequence are designated 1-1, 1-2, . . . 1-16, those contained in the second sequence are designated 2-1, 2-2, . . . 2-16 and those in the third sequence are designated 3-1, 3-2, . . . 3-16. The frame sync field of the incoming signal is followed by a channel identifier field which contains a sequence of channel identifiers ID1 through ID16 (which are respectively represented by hexadecimal values "00" through "0F") for respectively identifying sixteen outgoing low speed frames, or channels #1 through #16. The information data of the different channels are multiplexed into a data field that follows the channel identifier field.

Each of the low speed frames begins with a 3-byte-length frame sync field, a 1-byte-length identifier field and a data field. Demultiplexer 100 decomposes the sync field of the incoming frame so that the sync patterns of the #1 low-speed frame correspond respectively to sync patterns 1-1, 2-1 and 3-1 of the incoming frame, those of the #2 low-speed frame correspond to sync patterns 1-2, 2-2 and 3-2 and those of the #16 low-speed frame correspond to sync patterns 1-16, 2-16 and 3-16 of the incoming frame. As will be understood later, when demultiplexer 100 is synchronized with the incoming frame, the 3-byte-length sync field of each low speed frame will contain a sync pattern "F6F6F6" as shown in FIG. 2.

In a bit-sync condition, sync pattern "F6F6F6" appears at each set of 8-bit-wide output ports 103-1 to 103-16. Namely, the simultaneous appearance of the sync pattern "F6F6F6" at all the output ports is unique to the demultiplexer 100 for establishing bit synchronization. If out-of-sync condition occurs, however, there will result in the simultaneous appearance of a different bit pattern at all the 8-bit-wide output ports 103-1 to 103-16. This different bit pattern is one of seven bit patterns which is one or more bits shifted with respect to the sync pattern "F6F6F6" depending on the number of bits by which the demultiplexer 100 is delayed or advanced with respect to the incoming frame.

If the bit timing of demultiplexer 100 is either one bit delayed or seven bit advanced with respect to the incoming frame, the sync pattern "11110110", "11110110", "11110110", or hexadecimal F6F6F6 will change to "11101101", "11101101", "1110110x", where x is 1 or 0, or hexadecimal EDEDEX, (where X indicates a four-bit symbol containing one or more indefinite logical values 1 or 0). Likewise, a two-bit delay or six-bit advance will cause the sync pattern to change to "11011011", "11011011", "110110xx", or hexadecimal DBDBDX. It will be seen that for three-to seven-bit delays (or five- to one-bit advance) will result in the following unique bit patterns:

3-bit delay (5-bit advance): "10110111", "10110111", "10110xxx"=hexadecimal B7B7BX 4-bit delay (4bit advance): "01101111", "01101111", "0110xxxx"=hexadecimal 6F6F6X 5-bit delay (3-bit advance): "11011110", "11011110", "110xxxxx"=hexadecimal DEDEXX 6-bit delay (2-bit advance): "10111101", "10111101", "10xxxxxx"=hexadecimal BDBDXX 7-bit delay (1-bit advance): "01111011", "01111011", "0xxxxxxx"=hexadecimal 7B7BXX Bit sync detector 104-0 detects the sync pattern "F6F6F6" and generates a $\overline{\text{SYNC DETECT}}$ signal for coupling to an encoder 105 and a frame sync pulse at terminal 106. Delay detector 104-1 is a one-bit delay delay detector which detects a bit pattern "EDED" and generates an 'EDED' $\overline{\text{DETECT}}$ signal for coupling to the encoder 105. Likewise, delay detectors 104-2 to 104-7 are respectively 2-bit to 7-bit delay detectors which detect bit patterns "DBDB", "B7B7", "6F6F", "DEDE", "BDBD", and "7B7B", respectively, to apply a logic-0 pattern DETECT signal to the encoder 105.

Encoder 105 translates the logic-0 DETECT signal applied thereto into a three-bit count-up (or count-down) code according to its relative position at the inputs of encoder 105 and applies it to a modulo-27 counter 107. The incoming high speed TDM signal is also applied to a clock recovery circuit 109 to recover the line clock at frequency $f_0$ and supplies it to the count input of the counter 107 and a divide-by-$(8\times16)$ counter 108. A clock pulse is generated at intervals $(8\times16)/f_0$ by counter 108 and supplied to the detectors 104-0 to 104-7. At clock intervals $(1/f_0)$, counter 107 generates a 7-bit code signifying each one of the output ports of demultiplexer 100 and supplies it to the control ports 102 of demultiplexer 100 as a switching signal. If out-of-bit-sync condition occurs, the 7-bit code of the counter 107 is either advanced by n bits or retarded by $(8-n)$ bits as specified by the 3-bit bit-timing correction code from the encoder 105.

Even if bit synchronization is established, there is a possibility of the occurrence of an out-of-sync condition in which the #1 to #16 channel signals are not correctly demultiplexed to their respective output ports 103-1 to 103-16 if the timing discrepancy is more than 8 bits. To this end, a channel sync detector, or channel identifier detector 110 is provided to receive demultiplexed 16successive bits from successive channel identifier field appearing at the 8-bit output ports 103-15 and 103-16, a 3-bit bit-timing correction signal from encoder 105 and a frame sync pulse. This frame sync pulse is derived from the sync detector 104-0 as well as from the delay detectors 104-2 to 104-7 and selected by a selector 111 according to the 3-bit code from the encoder 105. As will be described later, channel sync detector 110 supplies a 4-bit channel correction signal to the fourth stage to the seventh (MSB) stage of counter 107 to establish proper channel sync timing with the incoming data.

Figure 3:
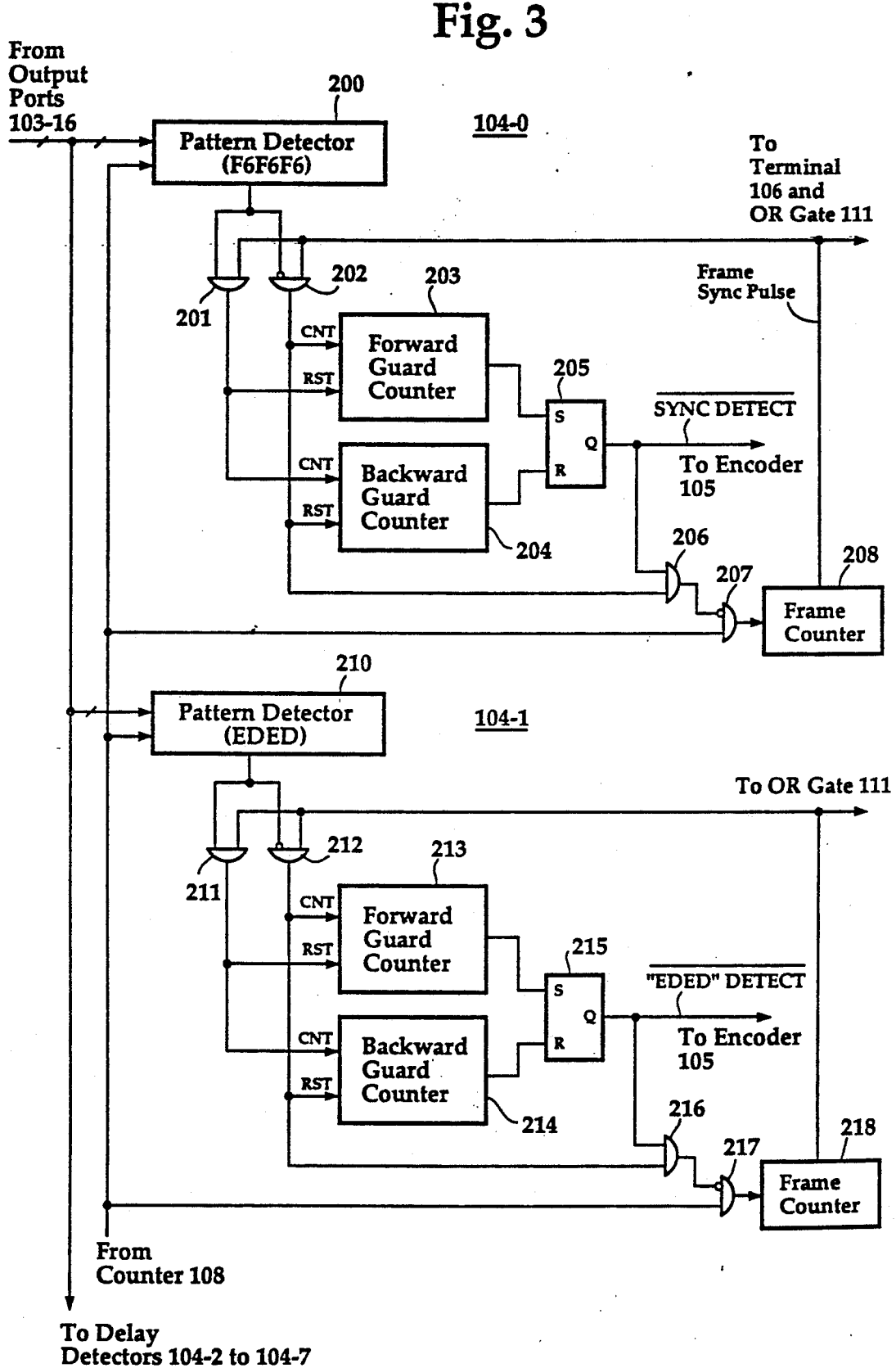
FIG. 3 is a block diagram illustrating details of the bit sync detector and the 1-bit out-of-frame detector of FIG. 1.

FIG. 3 illustrates one example of the bit sync detector 104-0 and delay detectors 104-1 through 104-7. For simplicity, details of the detectors 104-0 and 104-2 are illustrated.

Bit sync detector 104-0 comprises a bit pattern detector 200 which detects a bit pattern "F6F6F6" which appears at output ports 103-16 at intervals $(8\times16)/f_0$ and supplies a logic-1 output upon detection of the pattern to a coincidence gate 201 and a noncoincidence gate 202. The output of coincidence gate 201 is applied to the reset input of a forward guard counter 203 and the count input of a backward guard counter 204, and the output of noncoincidence gate 202 is applied to the count input of forward guard counter 204 and to the reset input of backward guard counter 204. The outputs of counters 203 and 204 are respectively connected to the set and reset inputs of a flip-flop 205, whose Q output is coupled to an AND gate 206 to which the output of noncoincidence gate 202 is also applied. Synchronously with the 8-bit code supplied from demultiplexer 100 to detector 200, the clock pulse from the divide-by-$(8\times16)$ counter 108 is supplied to detector 200 and to a noncoincidence, or clock control gate 207 to which the output of AND gate 206 is also applied. A frame counter 208 is connected to the output of clock control gate 207 to supply a frame sync pulse to the coincidence and noncoincidence gates 201 and 202 as well as to the output terminal 106.

With the clock control gate 207 being initially enabled in response to a logic-0 input from AND gate 206, the clock pulses from counter 108 are admitted to frame counter 208. When a predetermined count is reached, frame counter 208 produces a frame sync pulse and supplies it to the gates 201 and 202. If the demultiplexer 100 is synchronized with the incoming frame, sync pattern "F6F6F6" is detected by the bit pattern detector 200 and a logic-1 pulse is fed to the gates 201 and 202 coincident with the frame sync pulse from counter 208. Coincidence gate 201 produces a logic-1 output and and noncoincidence gate 202 produces a logic-0 output. Therefore, at frame intervals, the forward guard counter 203 is reset, producing a logic-0 output, and the backward guard counter 204 is incremented. If the sync state continues, a preset backward count value is reached in the backward guard counter 204 and a logic-1 output is supplied to the reset input of flip-flop 205, producing a logic-0 at the Q output, i.e., $\overline{\text{SYNC DETECT}}$ signal. As a result, AND gate 206 remains disabled, allowing clock pulses from counter 108 to be supplied to frame counter 208.

If the frame timing of the demultiplexer 100 begins to lose synchronism with the incoming frame, the system is said to enter a transition state, or "forward guard mode". When this occurs, pattern detector 200 fails to detect the sync pattern "F6F6F6", resulting in the application of a logic-0 to coincidence and noncoincidence gates 201 and 202 producing a logic-1 output at the output of noncoincidence gate 202. To determine if the out-of-sync condition is due to out-of-sync condition or due to bit errors in the sync pattern "F6F6F6", the forward guard counter 203 increments its count at frame intervals in response to the logic-1 input from the noncoincidence gate 202. During this mode the backward guard counter 204 is repeatedly cleared at frame intervals. If the loss of synchronism is due to out-of-sync condition, the forward guard counter 203 will reach a preset value and a logic-1 output is supplied to flip-flop 205, causing its Q output to switch from logic-0 to logic-1 state, terminating the forward guard mode and entering a hunting mode. Clock control gate 207 is thus disabled to cease the application of clock pulses to frame counter 208. As a result, the output of frame counter 208 is held at logic-1 level. This hunting mode will continue until the bit pattern detector 200 detects a sync pattern "F6F6F6", whereupon the forward guard counter 203 is cleared and the backward guard counter 204 begins incrementing its count at frame intervals. At the same time, frame counter 208 resumes count operation and the system is said to enter a "backward guard mode" which continues until the backward guard counter 204 reaches a preset value. When this occurs, flip-flop 205 will be reset, switching its Q output to logic-0 to produce a $\overline{\text{SYNC DETECT}}$ signal. The function of backward guard counter 204 is to prevent possible bit errors in the incoming signal from causing a false bit synchronization.

One-bit delay detector 104-1 comprises a bit pattern detector 210 which detects the 1-bit shift pattern "EDED" to apply a logic-1 output to coincidence and noncoincidence gates 211 and 212 to which the output of frame counter 218 is also connected. Forward guard counter 213 and backward guard counter 214 are responsive to the outputs of gates 211 and 212 as in the bit sync detector 104-0 to provide the forward and backward guard modes. Flip-flop 215, coupled to the outputs of counters 213 and 214, generates an '$\overline{\text{EDED}}$ DETECT' signal which lasts from the end of a backward guard mode to the end of a forward guard mode. AND gate 216 combines the outputs of flip-flop 215 and noncoincidence gate 212. Clock control gate 217 allows clock pulses from counter 108 to frame counter 218 when enabled in response to a logic-0 input from AND gate 216.

Figure 4:
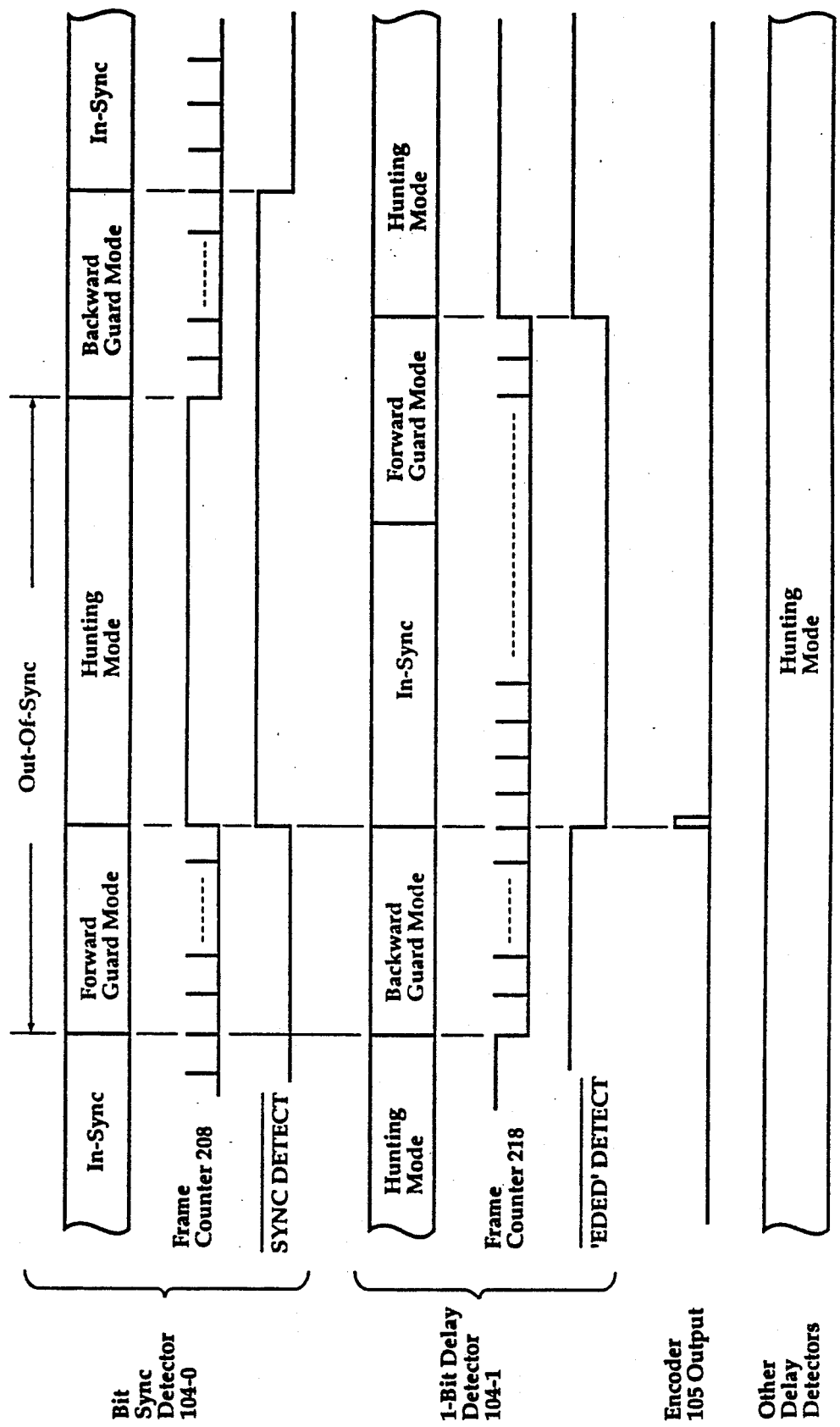
FIG. 4 is a timing diagram useful for describing the operation of the detectors of FIG. 3.

The operation of the bit sync detector 104-0 and delay detector 104-1 will be given with reference to a timing diagram shown in FIG. 4. The system is assumed to be initially locked in bit sync with the incoming TDM signal, and hence the encoder 105 is supplied with a $\overline{\text{SYNC DETECT}}$ signal from detector 104-0 and logic-1 signals from delay detectors 104-1 to 104-7. When the timing of demultiplexer 100 begins to slip with respect to the incoming TDM frame, bit sync detector 104-0 enters a forward guard mode for counting the output of frame counter 208. If there is a one-bit delay, detector 104-1 will detect a pattern "EDED" and enters a backward guard mode for counting the output of frame counter 218. At the end of the forward guard mode, the bit sync detector 104-0 enters a hunting mode, producing a logic-1 at the output of flip-flop 205. Delay detector 104-1 enters an in-sync state at the end of backward guard mode, producing an '$\overline{\text{EDED}}$ DETECT' signal. In response to the leading edge of the '$\overline{\text{EDED}}$ DETECT' signal, encoder 105 applies a 3-bit timing correction code (1-bit count-up or 7-bit count-down) to the first (LSB) stage to third stage of modulo-$2^7$ counter 107 to correct the out-of-bit sync condition. Bit sync detector 104-0 will detect the sync pattern "F6F6F6" again during the hunting mode and enters a backward guard mode to count the output of frame counter 205 to ensure against possible bit errors. Meanwhile, delay detector 104-1 will lose synchronism with the bit pattern "EDED" and enter a forward guard mode. At the end of backward guard mode, detector 104-0 enters an in-sync state and, detector 104-1 enters a hunting mode again at the end of its forward guard mode. The other delay detectors 104-2 to 104-7 remain in a hunting mode ready to detect their respective out-of-sync shift patterns.

Figure 5:
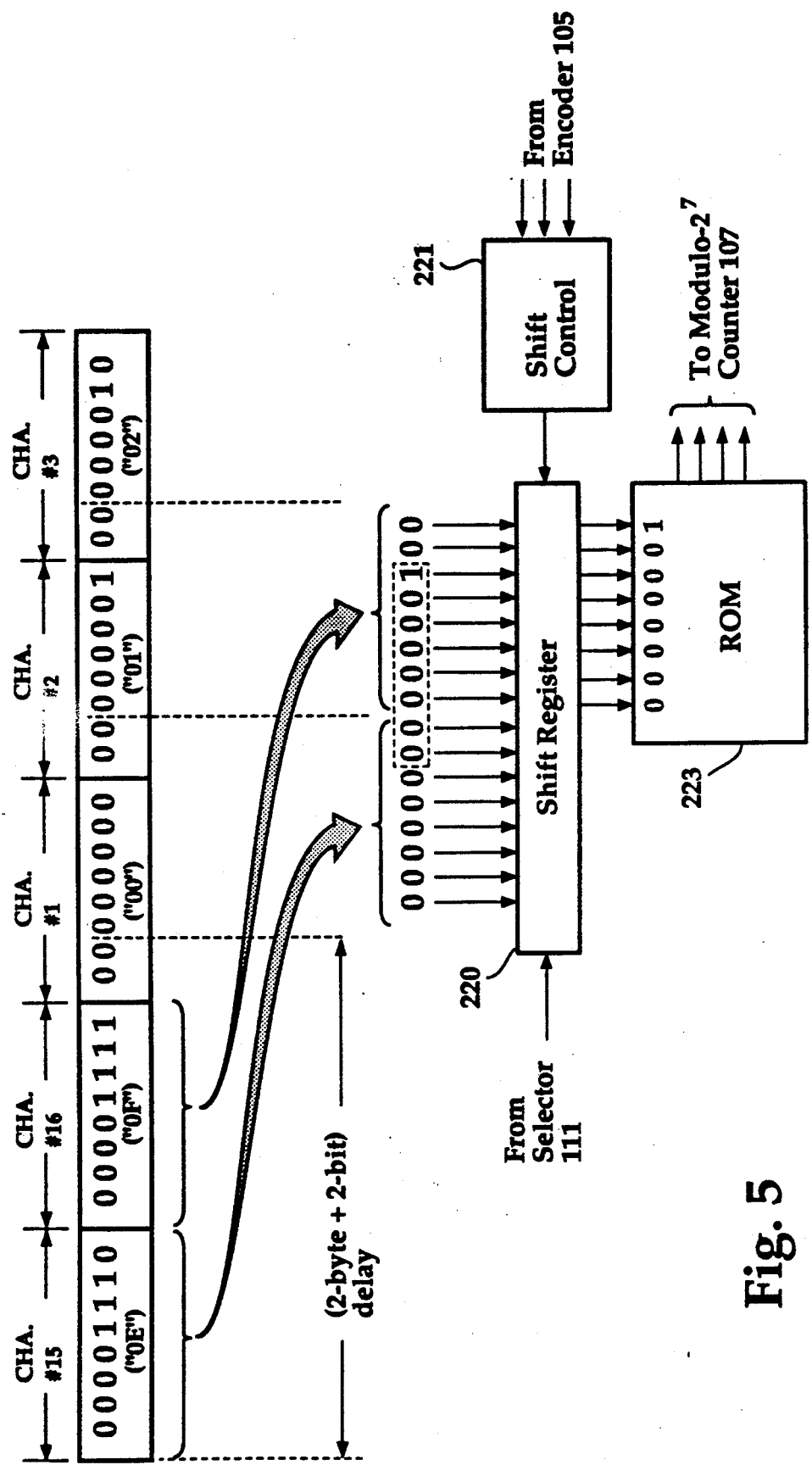
FIG. 5 is a circuit diagram of the channel sync detector of FIG. 1, showing several channel identifiers supplied to the channel sync detector as a typical example of out of bit sync as well as out of channel sync conditions.

Details of the channel sync detector 110 are shown in FIG. 5. Detector 110 includes a 16-stage shift register 220 into which the 2-byte data from the output ports 103-15 and 103-16 are stored in response to the application of a frame sync pulse from the 2-bit delay detector 104-2 via selector 111. A shift controller 221 shifts the stored bits to the right by an amount specified by the 3-bit code from the encoder 105. Shift register 220 has eight output leads which are connected from the eight stages to the right of the shift register to a read-only memory 223. If there is a 2-byte plus 2-bit delay between the system timing and the incoming TDM signal, there appear a string of "0000000000000100" which extends from channel #1 to channel #3 as illustrated, at the output ports 103-15 and 103-16 of the #15 and #16 channels; and the register 220 is filled with these identifier bits. Because of the two-bit delay, the 2-bit delay detector 104-2 will detect the DBDB bit pattern and encoder 105 supplies a 3-bit code to the shift controller 221 as well as to the modulo-27 counter 107 to advance it by a 2-bit count. The sixteen bits stored in shift register 220 is shifted to the right by two bits in response to the output of shift controller 221. Therefore, the 8 bits now stored in the right half of the shift register correspond exactly to the identifier ID2 ("01") of channel #2. Since the channel spacing between channel #16 and channel #2 can be uniquely determined by the channel identifier ID2, the ROM 223 stores 4-bit codes representing the amount of channel timing correction in terms of (8-bit × n) where n ranges from zero to 16. The 8-bit output of shift register 220 is applied to ROM 223 as an address signal to cause it to supply a 4-bit channel correction code to counter 107. Therefore, counter 107 will be advanced by 2 bytes in response to the 4-bit code from ROM 223 to correct the channel discrepancy in addition to the 2-bit timing discrepancy which was corrected in response to the 3-bit code from encoder 105.

Figure 6A:
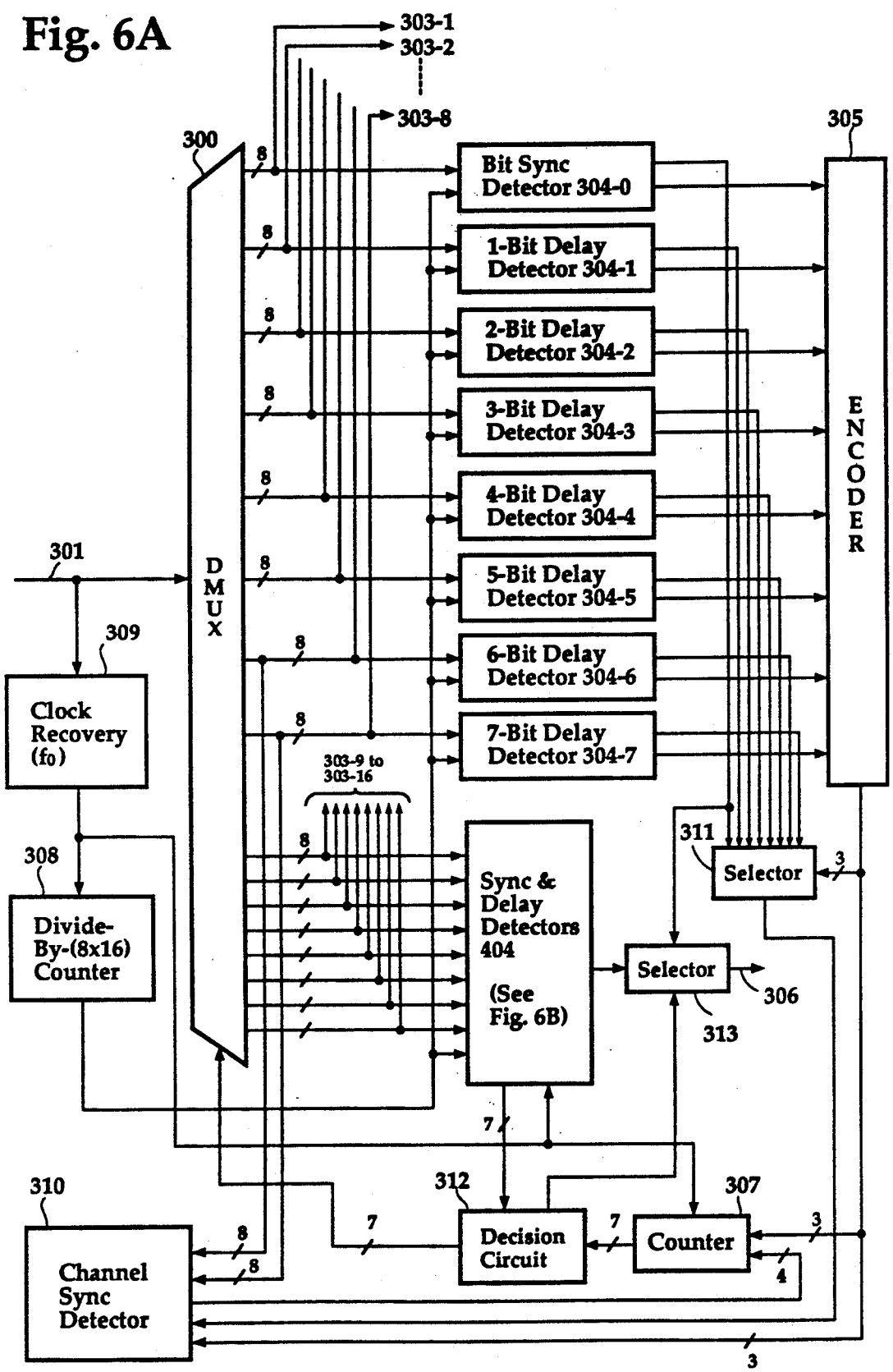
FIGS. 6A and 6B are block diagrams of a second embodiment of the present invention in which all sync and delay detectors are associated with output ports of a demultiplexer.
Figure 6B:
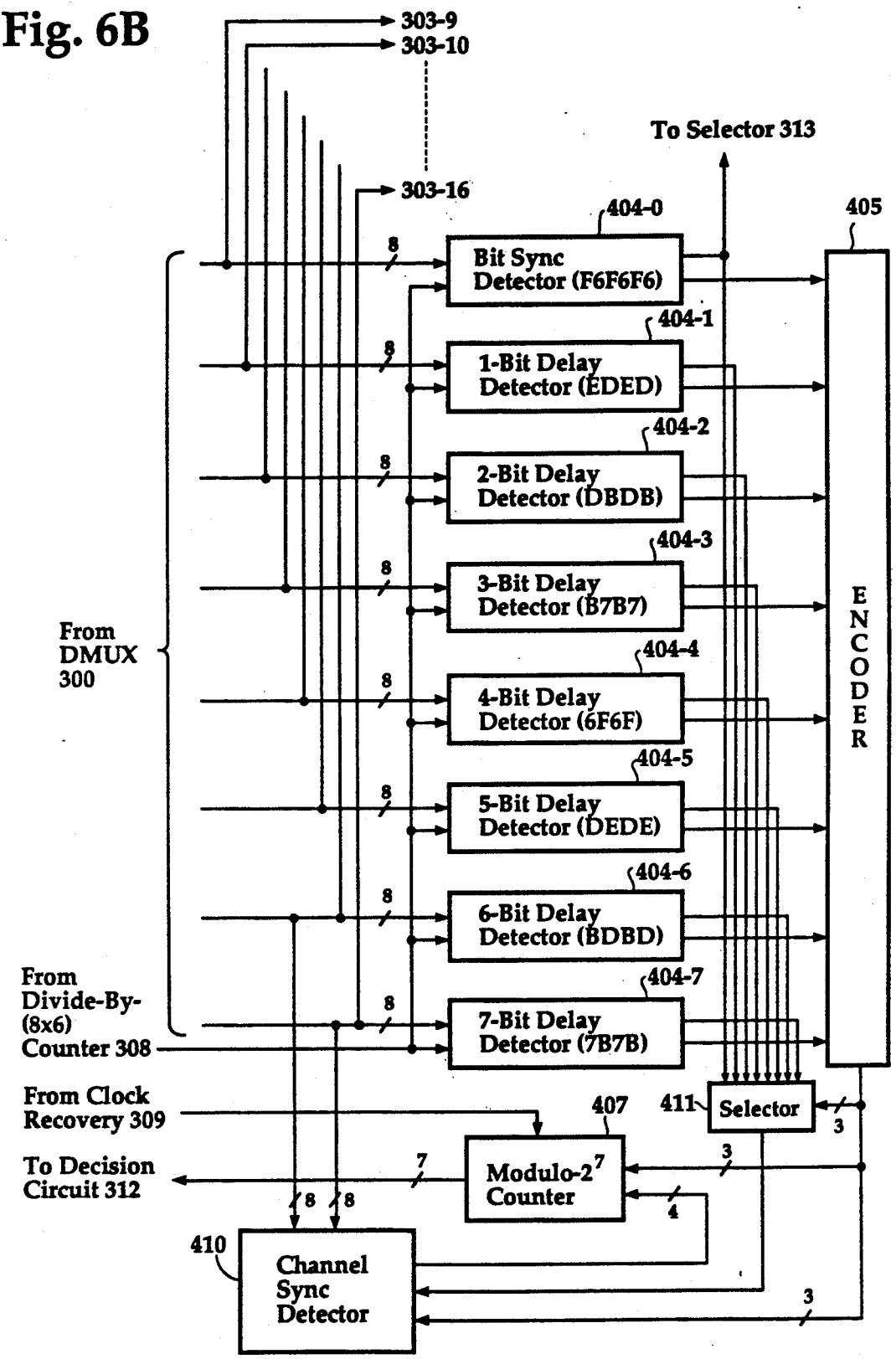

Since the frame synchronizer is connected to the output ports 103-16, a loss or corruption of the channel #16 data will cause a continued loss of frame synchronization. A second embodiment of the present invention shown in FIGS. 6A and 6B is to eliminate such possibilities by connecting the frame synchronizer to all the output ports 303-1 to 303-16 of a demultiplexer 300. More specifically, bit sync detector 304-0 and 1-bit to 7-bit delay detectors 304-1 to 304-7 are connected respectively to output ports 303-1 to 303-8 as shown in FIG. 6A and bit sync detector 404-0 and 1-bit to 7-bit delay detectors 404-1 to 404-7 are connected respectively to output ports 303-9 to 303-16 as shown in FIG. 6B. Clock recovery circuit 309 supplies clock pulses at frequency $f_0$ and divide-by-(8 × 16) counter 308 supplies clock pulses at frequency $f_0/(8 \times 16)$ to all the sync and delay detectors. Encoder 305, channel sync detector 310, selector 311 and modulo-$2^7$ counter 307 are associated with the sync and delay detectors 304-0 to 304-7 in a manner identical to that shown in FIG. 1, while encoder 405, channel sync detector 410, selector 411 and modulo-$2^7$ counter 407 are likewise associated with the sync and delay detectors 404-0 to 404-7 Thus, modulo-$2^7$ counters 307 and 407 produce their respective output regardless of the loss or corruption of data in one of the channels.

One of the outputs of the counters 307 and 407 is selected by a decision circuit 312 and supplied to the demultiplexer 300 as a valid switching signal. Decision circuit 312 operates as an OR gate when there is only one input from the counters. When equal inputs are supplied from the counters, decision circuit 312 allows one of the inputs to the demultiplexer 300. If two inputs of different values are supplied, decision circuit 312 stores them for making a majority decision. If one of the different counter inputs is greater in number, the decision circuit takes this as a most likelihood signal for coupling to the demultiplexer 300. The frame sync pulses from bit sync detectors 304 and 404 are coupled to a selector 313 which passes one of these pulses to an output terminal 306 in accordance with an output signal from the decision circuit 312, so that if the output of counter 307 is applied to the demultiplexer, the frame sync pulse of bit sync detector 304-0 is applied to the output terminal 306.

Figure 7A:
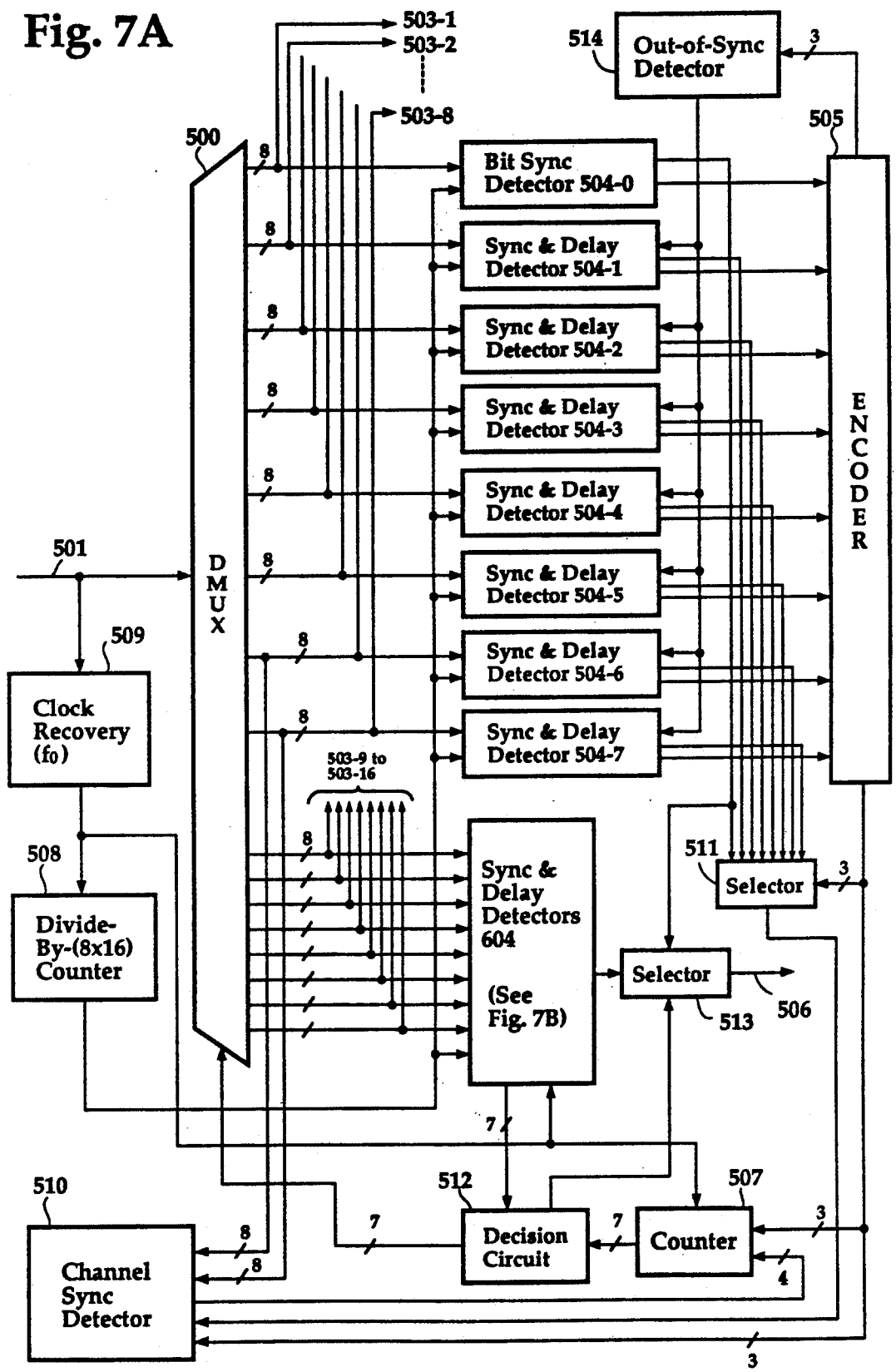
FIGS. 7A and 7B are block diagrams of a third embodiment of this invention in which sync and delay detectors are provided to effect switching between sync pattern detection and shift pattern detection.
Figure 7B:
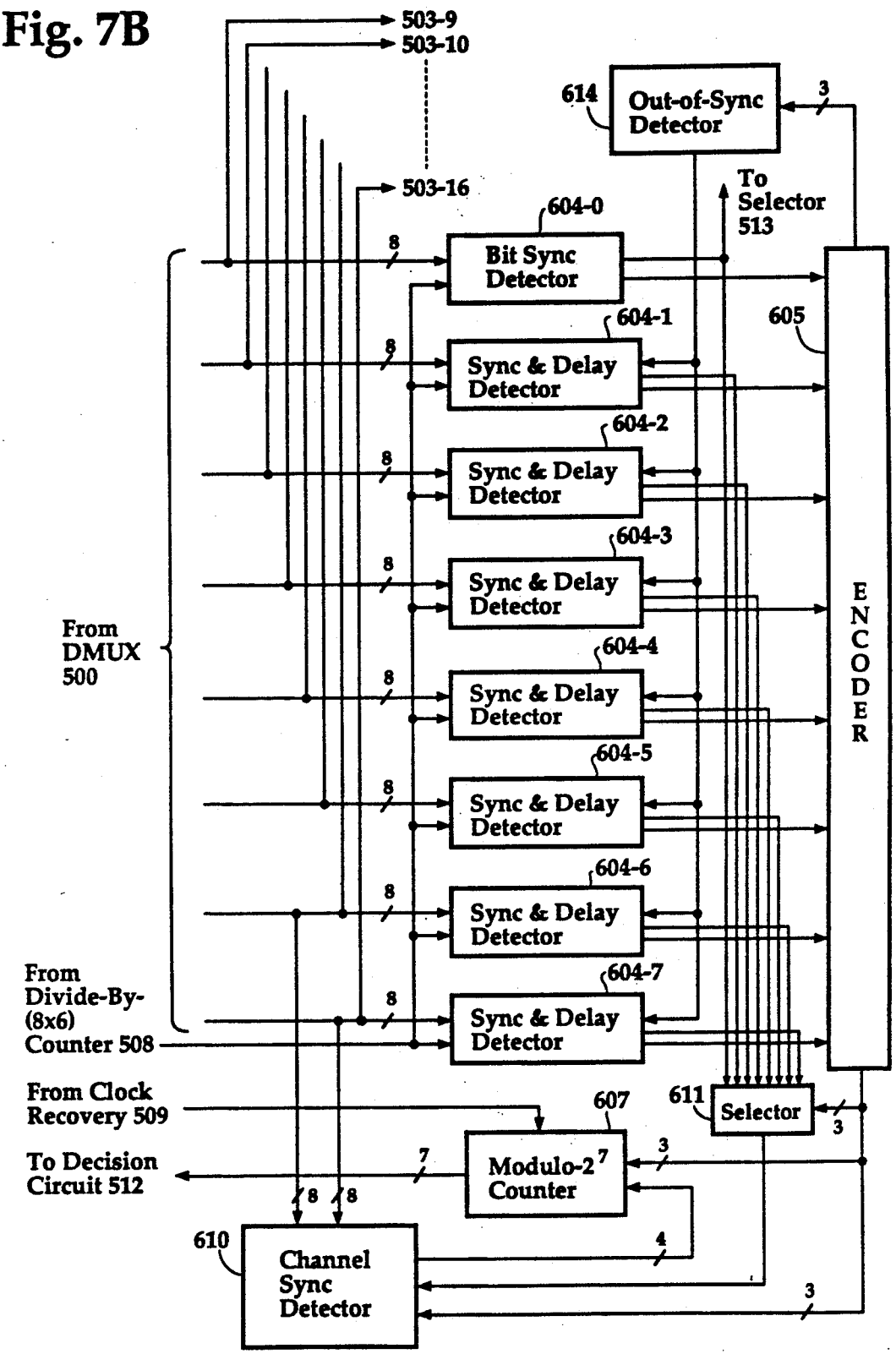

A third embodiment of the present invention is shown in FIGS. 7A and 7B. This embodiment is advantageous for practical purposes and is generally similar to that shown in FIGS. 6A and 6B except that, in place of delay detectors 304 and 404, switched sync and delay detectors 504 and 604 are provided. Bit sync detector 504-0 (604-0) is identical to the bit sync detectors 104-0 and 304-0 (404-0) of the previous embodiments. Switched sync and delay detectors 504-1 to 504-7 (604-1 to 604-7) are normally set to detect the sync pattern "F6F6F6" when demultiplexer 500 is in bit-sync condition. An out-of-sync detector 514 (614) is provided to respond to a 3-bit code from encoder 505 (605) by detecting that the demultiplexer timing is out-of-sync with the incoming TDM signal at input terminal 501 to which clock recovery circuit 509 is connected. When this occurs, out-of-sync detector 514 (614) supplies the sync-and-delay detectors 504-1 to 504-7 (604-1 to 604-7) with a switching signal to set them in a condition to detect shift patterns "EDED", "DBDB", "B7B7", "6F6F", "DEDE", "BDBD", and "7B7B", respectively, and to supply a $\overline{\text{DETECT}}$ signal to encoder 505 (605) when any of these patterns is detected. More specifically, when the system begins to lose synchronism with the incoming TDM signal, all detectors 504-0 to 504-7 (604-0 to 604-7) enter a forward guard mode. If this condition still continues, they enter a hunting mode and supply logic-1 signals to encoder 505 (605) (see FIG. 4). This hunting mode is detected by the out-of-sync detector 514 (614) for switching the sync and delay detectors 504-1 to 504-7 (604-0 to 604-7) to their respective shift patterns. Selector 511 (611) combines the frame sync outputs of detectors 504-0 to 504-7 (604-0 to 604-7) to an input of channel sync detector 510 (610) which responds to the encoder 505 (605) by supplying a 4-bit channel timing correction signal to modulo-$2^7$ counter 507 (607). Decision circuit 512 allows one of the counter outputs to be applied to demultiplexer 500 and causes selector 513 (613) to selectively pass the frame sync output of detector 504-0 or 604-0 to output terminal 506 in a manner similar to that described above.

Figure 8:
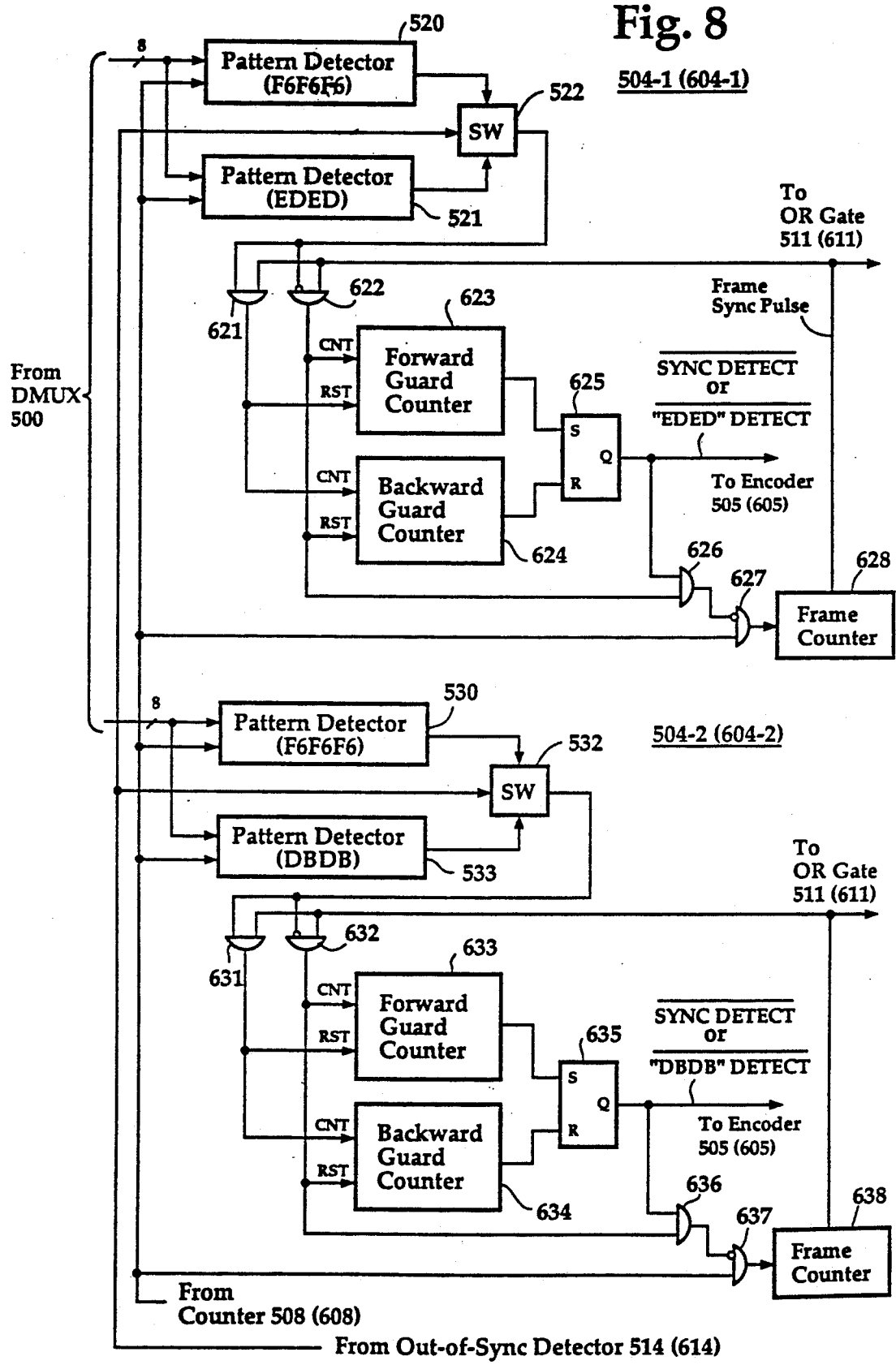
FIG. 8 is a circuit diagram of the details of sync and delay detectors of FIGS. 7A and 7B.

As shown in detail in FIG. 8, switched sync-and-delay detector 504-1 (604-1) comprises a first pattern detector 520 for detecting the sync pattern "F6F6F6" and a second pattern detector 521 for detecting the shift pattern "EDED" both of which are connected together to the output ports 503-2 (503-10) of demultiplexer 500. The output of pattern detector 520 is normally coupled through a switching circuit 522 to coincidence and noncoincidence gates 521 and 522. Switching circuit 522 responds to the switching signal from out-of-sync detector 514 (614) by switching its input from the output of detector 520 to the output of detector 521. Forward and backward guard counters 623, 624 are coupled to flip-flop 625 to generate a $\overline{\text{SYNC DETECT}}$ signal during in-sync or an EDED' DETECT/ signal during a one-bit out-of-sync for coupling to encoder 505 (605). The output of flip-flop 625 is coupled to AND gate 626 whose output is coupled to clock control gate 627. Frame counter 628, coupled to the output of gate 627, generates a frame sync pulse which is applied to selector 511 (611) on the one hand and to the gates 621 and 622 on the other.

In a similar manner, two-bit delay detector 504-2 (604-2) includes a first pattern detector 530 for detecting the sync pattern "F6F6F6" and a second pattern detector 531 for detecting the shift pattern "DBDB" both of which are connected together to the output ports 503-3 (503-11) of demultiplexer 500. The output of pattern detector 530 is normally coupled through a switching circuit 532 to coincidence and noncoincidence gates 631 and 632. Switching circuit 532 responds to the switching signal from out-of-sync detector 514 (614) by switching its input from the output of detector 530 to the output of detector 531. Forward and backward guard counters 633, 634 are coupled to flip-flop 635 to generate a $\overline{\text{SYNC DETECT}}$ signal during in-sync or an 'DBDB' $\overline{\text{DETECT}}$ signal during a two-bit out-of-sync for coupling to encoder 505 (605). The output of flip-flop 635 is coupled to AND gate 636 whose output is coupled to clock control gate 637. Frame counter 638, coupled to the output of gate 637, generates a frame sync pulse which is applied to selector 511 (611) on the one hand and to the gates 631 and 632 on the other.

Figure 9:
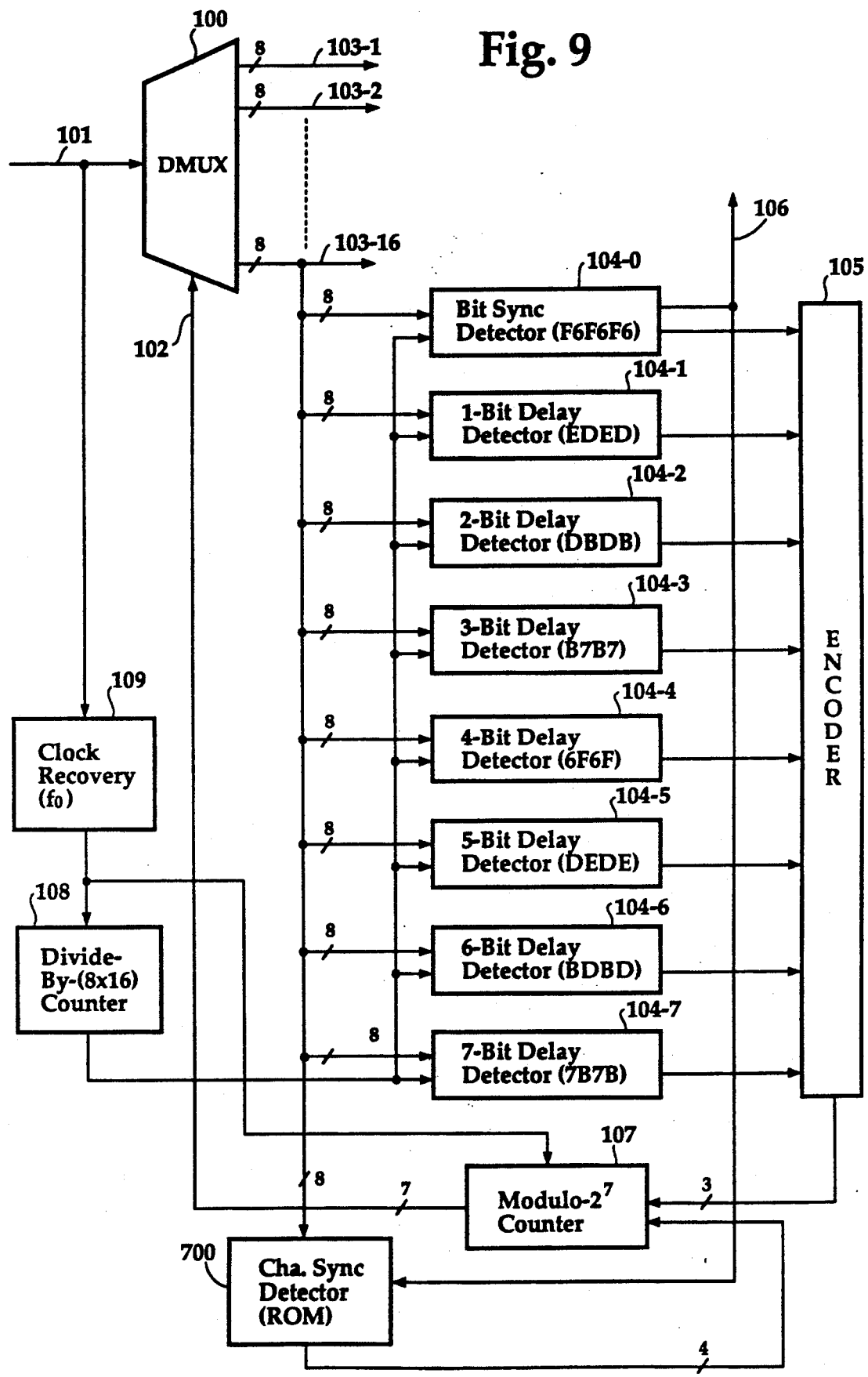
FIG. 9 is a block diagram of a modified form of the first embodiment of the present invention in which bit and channel synchronizations are reestablished in succession.

A modified form of the channel sync detector of FIG. 1 is shown in FIG. 9. In this modification, channel sync detector 700 is formed of a read-only memory having address inputs connected to the output ports 103-16 of demultiplexer 100. Detector 700 receives a frame sync pulse as a write enable command from the bit sync detector 104-0. When the system is in an in-sync state, the frame sync pulse applied to the ROM 700 causes it to read the channel identifier ID16 and generates no timing correction signal. If the system is delayed by 2 bytes plus 2 bits from the incoming TDM signal, bit sync detector 104-0 ceases to generate the $\overline{\text{SYNC DETECT}}$ signal and the 2-bit delay detector 104-2 detects a pattern "DBDB" and supplies a 'DBDB' $\overline{\text{DETECT}}$ signal to encoder 105. The latter generates a 3-bit code which is summed with the first to third stages of counter 107 to increment it by 2 bits. Thus, the system eventually restores bit-synchronism with the incoming TDM signal. In response to the reestablishment of bit synchronism, bit sync detector 104-0 generates a frame sync pulse, which is applied to the ROM 700 to allow it to write a channel identifier as an address signal. Since there is still a delay of 2 bytes, the channel identifier stored into the ROM 700 is that of channel #2, instead of ID16. In response to this address signal, ROM 700 generates a 4-bit code, which is summed with the fourth to seventh stages of the modulo-$2^7$ counter 107 to increment it by 2 bytes. Thus, the system is additionally advanced by 2 bytes to correct the remaining delay.

Figure 10:
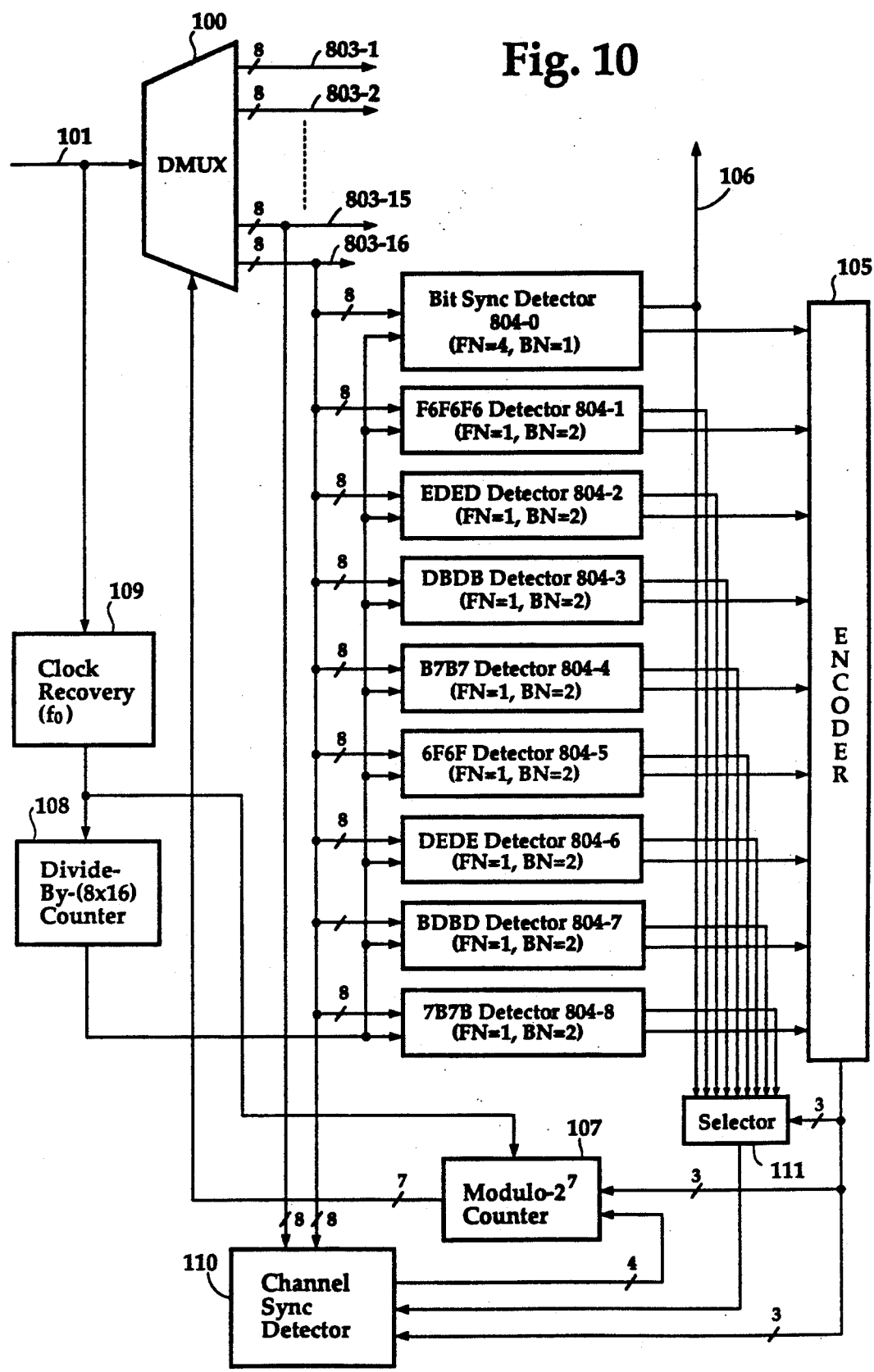
FIG. 10 is a block diagram of a further modification of the first embodiment of the present invention in which the bit sync detector and delay detectors have different count values for forward and backward guard modes for quick restoration of sync.
Figure 11:
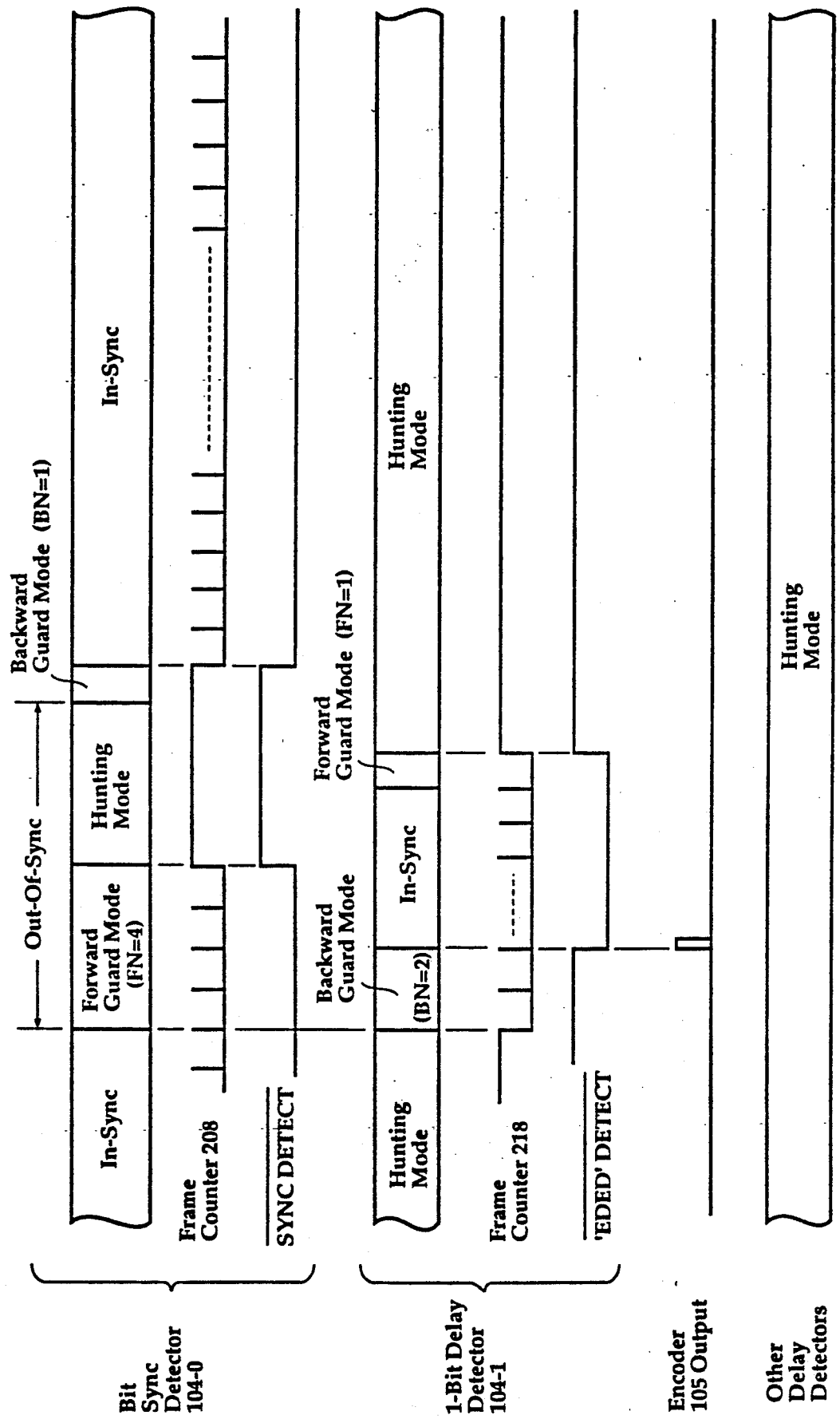
FIG. 11 is a timing diagram associated with the embodiment of FIG. 10.

A fourth embodiment of the invention is shown in FIG. 10. This embodiment is similar to but differs from FIG. 1 in that it includes a bit sync detector 804-0, a 0-bit delay detector or "F6F6F6" detector 804-1 and 1-bit to 7-bit delay detectors 804-2 to 804-8. The bit sync detector 804-0 has a forward guard counter with a count value FN=4 to define a long period for the forward guard mode and a backward guard counter with a count value BN=1 to define a short period for the backward guard mode. On the other hand, the forward guard counter of each of the other detectors 804-1 to 804-8 has a count value FN=1 to define a short period for the forward guard mode and the backward guard counter of each of these detectors has a count value BN=2 to define a longer period for the backward guard mode. When the system begins to lose bit synchronization, bit sync detector 804-0 enters the forward guard mode to count frame pulses. Because of the shorter forward guard mode than detector 804-0, any of the detectors 804-1 to 804-8 enters the hunting mode earlier than detector 804-0 does as illustrated in FIG. 11. In response to a logic-1, out-of-sync indicating signal from detector 804-0, encoder 105 determines the amount of delay smaller than 1 bit in accordance with the presence or absence of output signals from the detectors 804-1 to 804-8. This facilitates quick restoration of bit and channel synchronizations. In addition, the detector 804-1 can act as a spare unit of the bit sync detector 804-0 when the latter fails to detect the sync pattern.

Figure 12:
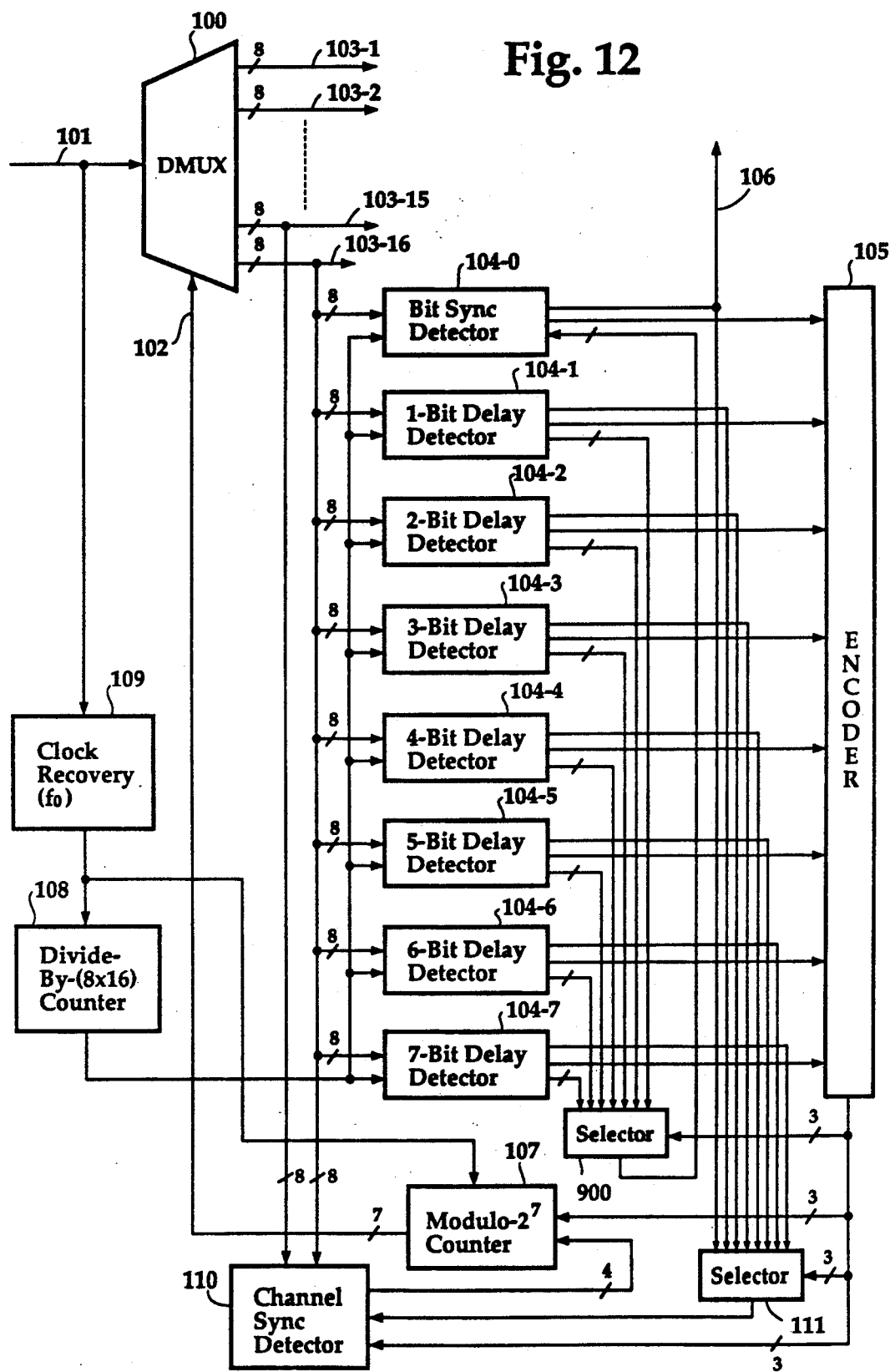
FIG. 12 is a block diagram of a still modification of the first embodiment of the invention for quick restoration of sync.
Figure 13:
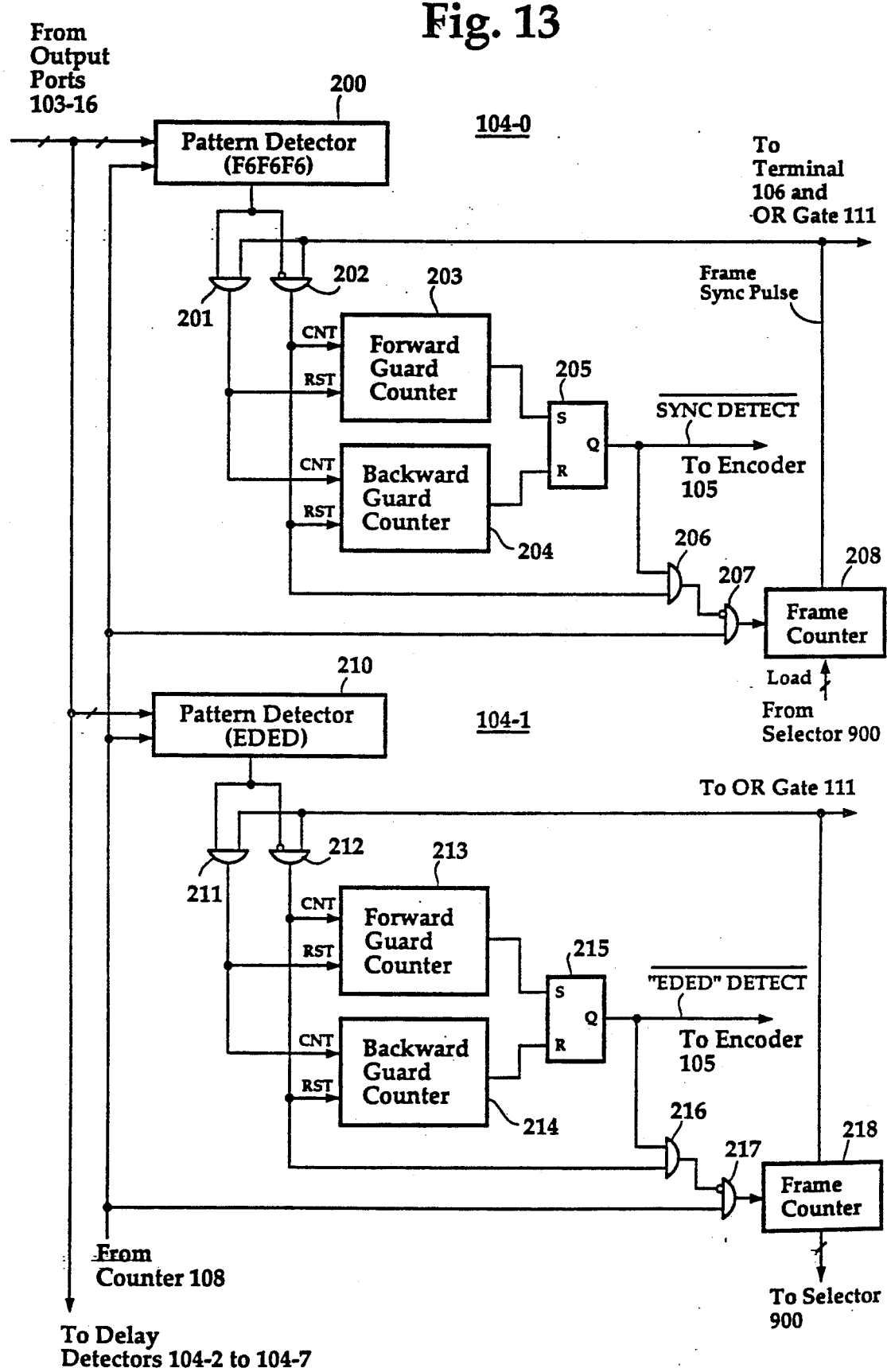
FIG. 13 is a circuit diagram of the details of the bit sync detector and the 1-bit out-of-frame detector of FIG. 12.

FIG. 12 is a block diagram of a further modification of the embodiment of FIG. 1. This embodiment includes a selector 900 having a plurality of input ports which are coupled respectively to the binary outputs of the frame counters of detectors 104-1 to 104-7. Selector 900 is responsive to the 3-bit output from encoder 105 to select one of the frame counter binary outputs supplied from the delay detector which has detected a shift pattern during an out-of-sync condition, the selected frame counter binary output being applied to the frame counter 208 of bit sync detector 104-0 to advance its instantaneous count value to the same count value. As shown in FIG. 13, the frame counter 218 of delay detector 104-1 has a binary output which indicates the instantaneous count value of frame pulses. This binary output is supplied to the selector 900. The selected binary output is applied to the load input of the frame counter 208 of bit sync detector 104-0. Therefore, as soon as the output of the bit sync detector 104-0 goes high indicating a loss of synchronism, its frame counter 208 is advanced to the same count value of one of the delay detectors 104-1 to 104-7 which has detected its unique shift pattern. In this way, quick restoration of in-sync condition is ensured.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A frame synchronizer adapted to receive an incoming high-speed TDM (time division multiplex) frame signal containing a sync field and a data field, said sync field containing a sequence of at least n synchronization codes of identical bit patterns and said data field containing a sequence of data segments of equal bit length, said frame synchronizer comprising:

demultiplexer means for decomposing the high speed TDM frame signal into the synchronization codes and the data segments and forming n low-speed frames each containing a respective one of the decomposed synchronization codes and a respective one of the decomposed data segments when timing of the demultiplexer means is in sync with said incoming TDM frame signal;

a plurality of bit pattern detector means for respectively detecting different bit patterns which are successively obtained by said demultiplexer means when the timing of the demultiplexer means is successively delayed or advanced with respect to the incoming TDM frame signal; and means for controlling the timing of said demultiplexer means in accordance with a bit pattern detected by said plural bit pattern detector means.

2. A frame synchronizer as claimed in claim 1, wherein each of said synchronization codes is composed of k bits, and wherein said demultiplexer means generates false codes of k bits each, when the timing of the demultiplexer means is successively delayed or advanced with respect to the incoming TDM frame signal, each of said false codes having one of (k−1) possible bit patterns each differing from the bit pattern of said synchronization codes, said plural bit pattern detector means respectively detecting said (k−1) possible bit patterns, wherein n=m×k, where m is an integer equal to or greater than unity.

3. A frame synchronizer as claimed in claim 2, wherein each of said data segments is composed of k bits and said demultiplexer means has n output ports for respectively causing the decomposed codes and data segments to appear respectively at said output ports, and wherein said plural bit pattern detector means are connected to a predetermined one of of said output ports.

4. A frame synchronizer as claimed in claim 2, wherein each of said data segments is composed of k bits and said demultiplexer means has n output ports for respectively causing the decomposed codes and data segments to appear respectively at said output ports, and wherein said plural bit pattern detector means are connected respectively to said output ports.

5. A frame synchronizer as claimed in claim 2, wherein said incoming TDM frame signal further contains a sequence of n channel identifiers respectively identifying said n data segments, and further comprising channel identifier detector means for detecting one of said channel identifiers, said controlling means being responsive to the detected channel identifier for controlling the timing of said demultiplexer means.

6. A frame synchronizer as claimed in claim 5, wherein the channel identifier detector means detects successive 2k bits from said demultiplexer means of the channel identifiers in response to the detection of any one of said (k−1) possible bit patterns of said false codes and selects k bits of the detected 2k bits in accordance with a bit timing difference corresponding to the detected bit pattern, said controlling means being responsive to the selected k bits of the detected 2k bits in accordance with a bit timing difference corresponding to the detected bit pattern, said controlling means being responsive to the selected k bits for controlling the timing of said demultiplexer means.

7. A frame synchronizer as claimed in claim 5, wherein the channel identifier detector means detects said one of the channel identifiers in response to the detection of a predetermined one of said different synchronization bit patterns when the timing of the demultiplexer means is in sync with the incoming TDM frame signal.

8. A frame synchronizer as claimed in claim 1, wherein one of the bit pattern detector means exclusively detects one of the synchronization codes of a predetermined bit pattern when the timing of the demultiplexer means is in sync with the incoming TDM frame signal, and each of the other bit pattern detector means comprises:
 a first pattern detector for detecting said one of the synchronization codes when the timing of the demultiplexer means is in sync with the incoming TDM frame signal; and
 a second pattern detector for exclusively detecting one of the other synchronization bit patterns in response to the detection of the predetermined bit pattern by the first pattern detector, said controlling means being responsive to output signals from the first and second pattern detectors for controlling the timing of the demultiplexer means.

9. A frame synchronizer as claimed in claim 1, wherein each of the bit pattern detector means comprises:
 a pattern detector for detecting the bit pattern of said synchronization codes and producing an output signal upon detection of the bit pattern;
 forward guard counter means for counting periodic pulses in the absence of the output signal of the pattern detector and generating a first counter output when the count reaches a predetermined forward count value;
 backward guard counter means for counting the periodic pulses in the presence of the output signal of the pattern detector and generating a second counter output when the count reaches a predetermined backward count value; and
 bistable means responsive to the first counter output for generating a signal indicating that the timing of said demultiplexer means is in sync with the incoming TDM frame signal and responsive to the second counter output for generating a signal indicating that the timing of said demultiplexer means is out of sync with thee incoming TDM frame signal.

10. A frame synchronizer as claimed in claim 9, wherein the forward count value of a first one of the bit pattern detector means is greater than the forward count value of a second one of the bit pattern detector means, the first and second bit pattern detector means detecting the bit pattern of the synchronization codes when the timing of the demultiplexer means is in sync with the incoming TDM frame signal.

11. A frame synchronizer as claimed in claim 1, wherein each of the bit pattern detector means further comprises:
 frame counter means for counting clock pulses at the frame intervals and generating a frame counter pulse output when the count reaches a predetermined value corresponding to the length of said low-speed frames and a binary output representing an instantaneous value of the count of the frame counter means;
 forward guard counter means for counting the frame counter pulse output when a preselected bit pattern is not detected by the pattern detector means and generating a forward guard counter output when the count reaches a predetermined forward count value;
 backward guard counter means for counting the frame counter pulse output when said preselected bit pattern is detected by the pattern detector means and generating a backward guard counter output when the count reaches a predetermined backward count value; and
 bistable means responsive to the forward guard counter output for generating a signal indicating that the timing of said demultiplexer means is in sync with the incoming TDM frame signal and responsive to the backward guard counter output for generating a signal indicating that the timing of said demultiplexer means is out of sync with the incoming TDM frame signal.

12. A frame synchronizer as claimed in claim 11, wherein the frame counter means of a first one of the bit pattern detector means is adapted to vary the instantaneous count value thereof, further comprising selector means for selecting the frame counter binary output generated by a second one of the bit pattern detector means when same detects the preselected bit pattern and applying the selected binary output to the frame counter means of said first one of the bit pattern detector means to advance the instantaneous count value thereof.

13. A frame synchronizer as claimed in claim 3, wherein said incoming TDM frame signal further contains a sequence of n channel identifiers respectively identifying said n data segments, and further comprising channel identifier detector means for detecting one of said channel identifiers, said controlling means being responsive to the detected channel identifier for controlling the timing of said demultiplexer means.

14. A frame synchronizer as claimed in claim 4, wherein said incoming TDM frame signal further contains a sequence of n channel identifiers respectively identifying said n data segments, and further comprising channel identifier detector means for detecting one of said channel identifiers, said controlling means being responsive to the detected channel identifier for controlling the timing of said demultiplexer means.

15. A frame synchronizer as claimed in claim 2, wherein said n equals eight.

16. A frame synchronizer adapted to receive an incoming high-speed TDM (time division multiplex) frame signal containing a sync field and a data field, said sync field containing a sequence of synchronization codes of identical bit patterns and said data field containing a sequence of data segments of equal bit length, said frame synchronizer comprising:
 demultiplexer means having a plurality of output ports and effective for decomposing the high speed TDM frame signal into the synchronization codes and the data segments and for generating low-speed frame signals respectively at said output ports, each of said low-speed frame signals containing a respective one of the decomposed synchronization codes and a respective one of the decomposed data segments when timing of the demultiplexer means is in sync with the incoming TDM frame signal;

a plurality of in-sync bit pattern detector means connected respectively to said output ports of the demultiplexer means for detecting the bit pattern of said synchronization codes which are successively obtained by said demultiplexer means when the timing thereof is in sync with said incoming TDM frame signal;

a plurality of out-of-sync bit pattern detector means connected respectively to said output ports of said demultiplexer means for respectively detecting different bit patterns which are successively obtained by said demultiplexer means when the timing thereof is successively delayed or advanced with respect to the incoming TDM frame signal; and means for maintaining the timing of said demultiplexer means in sync with said incoming TDM frame signal in accordance with an output signal from said plural in-sync bit pattern detector means and shifting said timing in accordance with a bit pattern detected by said plural out-of-sync bit pattern detector means.

* * * * *